US010301122B2

(12) United States Patent
Moroni et al.

(10) Patent No.: US 10,301,122 B2
(45) Date of Patent: May 28, 2019

(54) DEVICE FOR FEEDING ITEMS TO A SORTING MACHINE AND SORTING MACHINE

(71) Applicant: FIVES INTRALOGISTICS S.P.A. CON SOCIO UNICO, Lonate Pozzolo (Varese) (IT)

(72) Inventors: Lorenzo Moroni, Castellanza (IT); Lorenzo Chierego, Varese (IT); Attilio Soldavini, Ferno (IT)

(73) Assignee: FIVES INTRALOGISTICS S.P.A. CON SOCIO UNICO, Lonate Pozzolo (IT)

( * ) Notice: Subject to any disclaimer, the term of this patent is extended or adjusted under 35 U.S.C. 154(b) by 0 days.

(21) Appl. No.: 15/521,110

(22) PCT Filed: Oct. 21, 2015

(86) PCT No.: PCT/IB2015/058119
§ 371 (c)(1),
(2) Date: Apr. 21, 2017

(87) PCT Pub. No.: WO2016/067163
PCT Pub. Date: May 6, 2016

(65) Prior Publication Data
US 2017/0349385 A1    Dec. 7, 2017

(30) Foreign Application Priority Data
Oct. 29, 2014   (IT) .............................. MO2014A0310

(51) Int. Cl.
*B65G 47/52*    (2006.01)
*B65B 35/36*    (2006.01)
(Continued)

(52) U.S. Cl.
CPC ................ *B65G 47/52* (2013.01); *B07C 1/06* (2013.01); *B07C 3/06* (2013.01); *B07C 3/14* (2013.01);
(Continued)

(58) Field of Classification Search
CPC ....... B25J 9/1684; B25J 9/1697; B65G 47/52; B65B 35/36
See application file for complete search history.

(56) References Cited

U.S. PATENT DOCUMENTS 6,209,703 B1   4/2001   Soldavini
6,220,457 B1   4/2001   Resta
(Continued)

FOREIGN PATENT DOCUMENTS

DE    102010002317 A1    8/2011
EP    0927689 A1 *    7/1999    ........... B65G 17/345
(Continued)

*Primary Examiner* — Thomas Randazzo
(74) *Attorney, Agent, or Firm* — Pearne & Gordon LLP

(57) ABSTRACT

A device for feeding items to a sorting machine, including: a conveyor plane (26) for feeding items or parcels along an advancement direction (A1); an optical detection device (18), to allow the acquisition, while the items are in motion on the conveyor plane (26) of the three-dimensional coordinates of a determined number of points on the surface of the items and to organize them into coordinate vectors; a manipulator (19) provided to pick the items from the conveyor plane (26) and to place the items picked in a desired position; a control system, provided to process, for each item in motion on the conveyor plane (26), the coordinate vectors in order to obtain a three-dimensional representation of the item, including the information based on which the control system handles the manipulator for picking and placing the items.

(Continued)

The invention also relates to a sorting machine and a method for feeding items to a sorting machine aimed at increasing production capacity and accuracy thereof.

8 Claims, 15 Drawing Sheets

(51) Int. Cl.
  *B65G 43/08* (2006.01)
  *B65G 47/96* (2006.01)
  *B07C 3/06* (2006.01)
  *B07C 3/14* (2006.01)
  *B07C 1/06* (2006.01)
  *B25J 9/16* (2006.01)
  *B65B 35/30* (2006.01)
  *B65G 1/137* (2006.01)
  *B65G 47/90* (2006.01)
  *B65G 47/91* (2006.01)

(52) U.S. Cl.
  CPC ........... *B25J 9/1684* (2013.01); *B25J 9/1697* (2013.01); *B65B 35/30* (2013.01); *B65B 35/36* (2013.01); *B65G 1/137* (2013.01); *B65G 43/08* (2013.01); *B65G 47/905* (2013.01); *B65G 47/918* (2013.01); *B65G 47/96* (2013.01); *G05B 2219/37555* (2013.01)

(56) References Cited

U.S. PATENT DOCUMENTS

| | | | |
|---|---|---|---|
| 6,253,904 B1 | 7/2001 | Soldavini | |
| 6,690,995 B2 | 2/2004 | Prutu | |
| 6,952,628 B2 | 10/2005 | Prutu | |
| 8,843,232 B2* | 9/2014 | Hartmann | G05B 19/4182 |
| | | | 700/230 |
| 9,193,534 B2* | 11/2015 | Gehring | B65G 43/08 |
| 9,486,926 B2* | 11/2016 | Kawano | G06Q 10/087 |
| 9,555,447 B2* | 1/2017 | Lykkegaard | B07C 5/02 |
| 2003/0075416 A1 | 4/2003 | Prutu | |
| 2004/0162632 A1 | 8/2004 | Prutu | |
| 2013/0110280 A1* | 5/2013 | Folk | B65G 1/137 |
| | | | 700/215 |
| 2014/0014468 A1 | 1/2014 | Pilarz et al. | |
| 2016/0039550 A1* | 2/2016 | Boudreau | B65B 35/38 |
| | | | 53/446 |
| 2016/0145055 A1* | 5/2016 | Sielernnann | B65G 47/90 |
| | | | 414/751.1 |
| 2017/0102224 A1* | 4/2017 | Bridges | G01B 21/047 |
| 2017/0173798 A1* | 6/2017 | Watanabe | B25J 9/1697 |
| 2017/0211927 A1* | 7/2017 | Bridges | H04N 5/2251 |

FOREIGN PATENT DOCUMENTS

| | | | |
|---|---|---|---|
| EP | 0927689 | A1 | 7/1999 |
| EP | 0963928 | A1 | 12/1999 |
| EP | 0963929 | A1 | 12/1999 |
| FR | 2576528 | A1 | 8/1986 |
| WO | 03019122 | A1 | 3/2003 |

\* cited by examiner

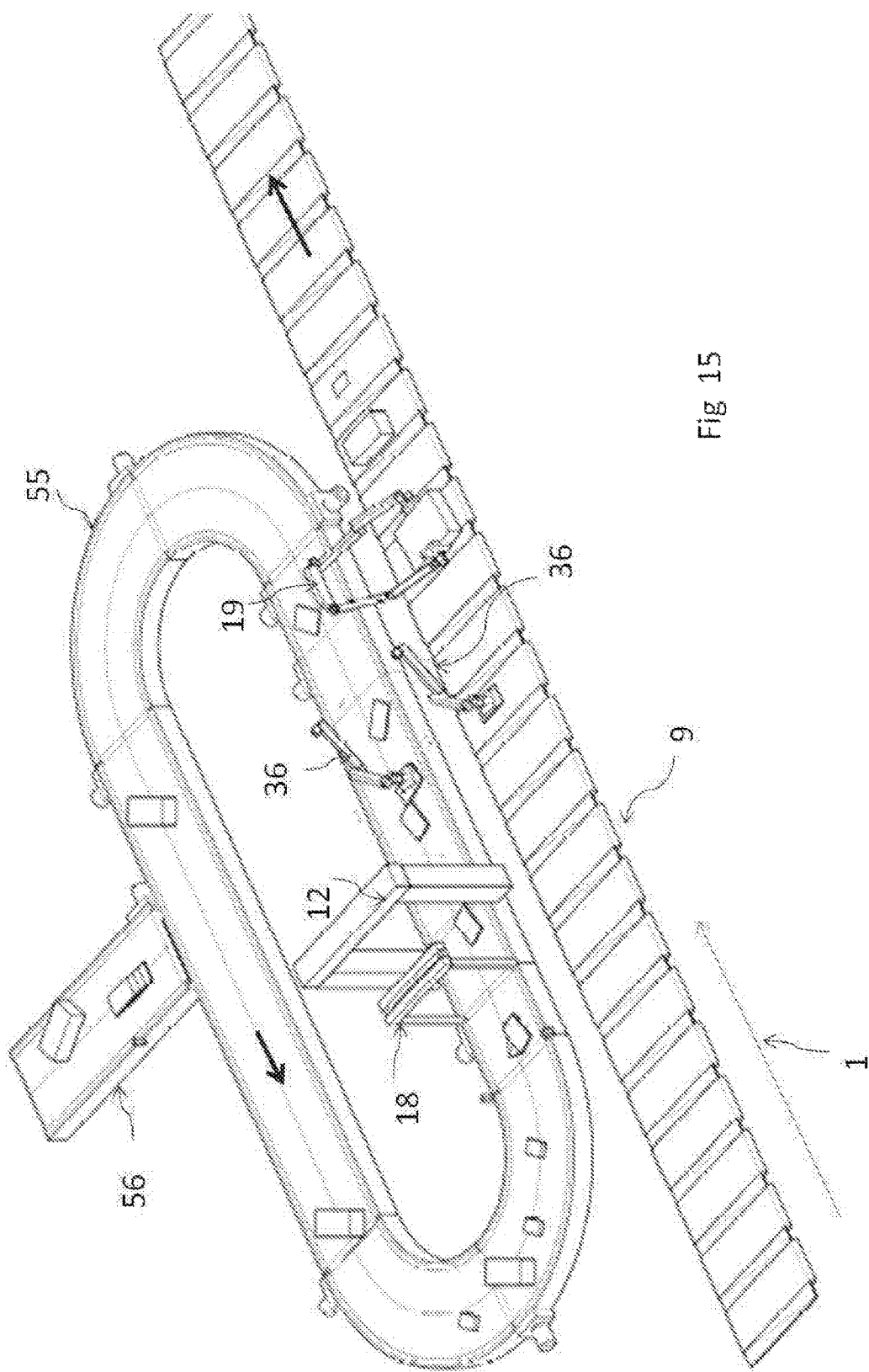

DEVICE FOR FEEDING ITEMS TO A SORTING MACHINE AND SORTING MACHINE

The invention relates to solutions for visual three-dimensional scanning of a parcels flow on a conveyor belt which is directed to the automatic loading station of a sorting machine, and for the robotised selective manipulation of parcels and envelopes within said flow; the solutions provided being aimed at increasing productivity and accuracy of the sorting system. The invention is particularly destined for use within the postal and courier distribution services, where the parcels are very heterogeneous in terms of size and packaging characteristics. Within the sectors as the ones mentioned above, very bulky parcels are also required to be loaded on the sorting machine, although the majority of items are medium and small size parcels and envelopes, which may be conveniently handled by manipulators of the type "pick and place". Based on the identification and three-dimensional measurement of parcels and envelopes located on the conveyor belt, the invention provides use of manipulators for picking the parcels from the conveyor belt and loading them exactly onto the sorting machine cells, thereby further overcoming the drawbacks of double parcels and envelopes arranged side by side or partially overlapped one above the other. Referring to those sorting machines capable of handling one bulky parcel or two parcels on the same sorting cell, which are so arranged as to be consecutively sorted according to the patents EP 0927689 and EP 0963929, the vision and manipulation solutions allow to obtain pairs of parcels on the loading line, which are suitably arranged and so oriented as to be loaded simultaneously onto the same sorting cell, thus significantly increasing the sorting machine capacity.

GENERAL INFORMATION AND AIMS OF THE INVENTION

A sorting machine has the task to sort and convey the items which are loaded on board, to respective destinations. The type of machine for the most important applications in terms of high productivity, number of destinations, and design flexibility, is the carousel sorting machine. The carousel sorting machine generally comprises carriages with equal pitch, being mutually connected in an articulated manner, thereby forming a chain, which slides along a closed path at constant speed that in current applications may be up to about 3 m/s. Run-in stations for automatic loading of each item onto the carriage, are facing the path of the sorting machine, as well as run-out stations, wherein the items with a common destination are unloaded and gathered. The "cross-belt" sorting machine is a carousel sorting machine, and is characterized in that each carriage is provided with a conveyor belt, referred to as "cell", whose actuation direction is orthogonal to the direction of the sorting machine. Other types of sorting machines exhibit tipper plates on board of the carriages, in order to receive parcels and sort them to destination. The cross-belt machine is more interesting for the present invention, although also applicable to other types of sorting machines due to the fact that its technical features allow to directly handle, on same machine, a great variety of parcels, packets, envelopes, bags, thin items called "flats," as well as bulky packages and heavy weights, typically falling within the flow of parcels handled in postal and courier sorting centers. FIG. 1 shows a typical illustration of a cross-belt machine (1), with two zones comprising the loading stations (2), having the task to load the parcels on the cells of the sorting machine, and some destination zones (3), consisting of slides for the gathering the parcels with same destination. FIG. 2 shows a high capacity automatic loading line located on the sorting machine, in the typical configuration of applications used within postal facilities or courier services. The station has the task to handle the individual parcel, identify it by reading its bar code, load it on board of a cell of the sorting machine with the longer side thereof oriented in the same direction of the cell belt, i.e. orthogonal to the direction of the machine, as shown by the parcel (10) of FIG. 2, and finally to transfer all information related to the parcel which were loaded, to the control system of the sorting machine. For the purposes of correct operation of the automatic loading station, it is required that the parcels are individually conveyed to the station, i.e. they shall be arranged one behind the other on a conveyor belt; thus, the flow of parcels which must be loaded onto the sorting machine, typically arises from a manual or automatic separation process. In the first case, parcels are unloaded by the operators from the containers or directly from the means of transport and placed on sequential unloading conveyor belts, so as to be easily separated from the subsequent belts and conveyed to an automatic loading station (2) on the sorting machine. In the second case parcels are usually unloaded onto a collector belt via a cage or pallet tippler, and the parcels flow is conveyed to a separator system. The separator system may comprise a sequence of rising-speed conveyor belts for separating the parcels longitudinally, further comprising conveyors with directional changes at 90° in order to facilitate separation of the parcels arranged side by side. Alternatively the system may comprise a dedicated separator machine aimed at providing, on its outlet, single parcels suitably spaced and with variable cadence, so as to conform to the availability of the loading line located on the sorting machine. The parcel flow outgoing from the manual or automatic separator and directed to the loading station (2), is handled by a series of short conveyor belts (15) shown in FIG. 2, which conveyor belts (15) have the task to separate the parcels according to a suitable pitch, through speed variations handled by means of side photocells located on the belts. Thus, parcels are aligned according to the longest side thereof, by means of a conveyor (14) which is formed by motorized rollers, inclined towards a vertical conveyor. The parcels thus oriented, are sent to the conveyor belt (13), which is generally provided with a system for weighing and measuring the volume of the parcel in motion, whereas the tunnel (12), consisting of image analysis chambers or laser scanner, provides to identify the bar code on the label applied to the parcel, in order to determine the parcel destination. Thus, the parcel which is controlled through the photocells barrier (11), is oriented according to the direction parallel to the cells of the sorting machine by the conveyor belt (4), which forms an angle of 60° with respect to the receiving belt (5). The launch speed of the belt (4) on the belt (5) is such as to attribute to the parcel a speed component in the direction of the belt (5), which is equal to the speed of the latter, so that the parcel can maintain its orientation on the belt (5), which orientation is parallel to the cells of the sorting machine. The parcel thus passes under the photocells barrier (6), in order to determine position, size and orientation thereof. Based on such information, a cell of the sorting machine is chosen which is suitable for loading the parcel and thereafter, synchronizers conveyors (7) speeds are handled in order to confer the parcel a trajectory which will lead the latter to meet the cell of the sorting machine. FIG. 2 shows in detail the loading onboard the cell of the sorting machine, wherein the conveyor belt (8) is inclined at 30° relative to the machine direction, and the speed (VI) thereof has a component in the machine direction which is equal to the speed of the sorting machine (Vs). The conveyor belt of the cell speed is activated at a speed (Vb) which is equal to the speed component of the belt (8), being orthogonal to the direction of the sorting machine. In this way, each point (p) of the cell belt has exactly the same speed (Vs+Vb=VI) of the belt at 30°, and thus of the barycentre (g) of the parcel (10) as shown in detail in FIG. 2. Hence, the parcel is loaded onboard without undergoing any rotation or deceleration. Once the transfer onboard of the parcel is terminated, the cell belt provides to stop the parcel on the cell on the base of a low deceleration value.

Within postal and express courier services, parcels and envelopes constitute the majority of the items handled, e.g. within the typical delivery flow of an express courier, parcels with dimensions up to 500×400×400 m represent about 60% of all the items handled. Large size and bulky parcels represent a small percentage within the delivery flow of an express courier, by way of example, parcels longer than 1000 mm represent only 3% of all the products handled. However it is particularly convenient to handle even the most bulky parcels, generally up to 1400×800×800 mm, on the same sorting machine. Indeed a possible manual handling of the parcels, wherein the same would have to be removed from the flow of parcels, unloaded by the transport means and directed to the sorting machine, would result cumbersome and expensive. The capacity of the automatic loading line to handle very bulky parcels, affects the design thereof in that, for the purposes of loading, bulky parcels shall be so oriented as to have their axes parallel to the units of the sorting machine, as shown by the parcel (10) in FIG. 2. The oriented parcel load, with the longest side thereof being perpendicular to the direction of the sorting machine, enables greater productivity of the latter, besides making easier and safer unloading of bulky items coming out from the sorting machine. Notwithstanding the above crucial advantages, it should be noted that the need of bulky parcels to be oriented on the loading line, reduces the capacity of the latter, i.e. the number of parcels loaded per minute when the line is handling small size items. Due to this, the number of automatic loading stations necessary for one loading operation becomes generally increased.

The current limit in relation to the productivity of the loading line, does not allow to fully exploit the capacity of separators, thus it often becomes necessary to distribute the flow coming out from the separators among several loading lines.

It is an object of the present invention to increase the loading line capacity, while maintaining unchanged its ability to handle very bulky parcels. Referring to those applications provided with automatic separator system, it is an aim of the invention to use a single loading line arranged downstream of a separator, without adversely affecting capacities thereof; This requirement basically corresponds to a doubling of the current capacity value of the loading line. A further primary drawback which may limit the capacity of the loading line, is attributable to the machine stops required for handling fault conditions caused by non-separated multiple items, which are detected by the optical barrier (6) the automatic loading station is provided with. FIG. 3 shows two typical separation errors (16) and (17); when detected by the optical barrier (6), such errors may cause stopping of the loading station, or result in sorting errors when not detected, wherein multiple items are loaded as a single item. Manual or automatic separation, is generally effective in the case of standard parcels of medium and large size, it is however less effective in the case of small parcels, little stiff and irregularly-shaped packages, packages which are unstable during transport, in particular low-thick items termed "flats". During separation or transport, it may happen that some items come to be arranged side by side, in particular it may happen that a small size parcel (17) comes to be flanked to a bulky parcel (shown in FIG. 3), for which bulky parcel the separating belts (15) of FIG. 2 are ineffective. The so-called "flats" are often arranged side by side or overlapped one above the other (16); the orienter (14) itself generally causes an increase in the number of cases wherein the "flats" become overlapped one above the other. Its angled rollers push the parcels against the vertical conveyor belt, which has higher speed than the speed of the rollers, so that the parcels are oriented according to the longest side thereof. Owing to the higher speed of the vertical belt, the orientor (14) may also help in solving cases wherein the parcels are disposed side by side, provided that the two parcels are of the standard type and of similar size. The above does not apply where a small size parcel (17) as shown in FIG. 3 is alongside a bulky parcel, and negative effects may even arise where the "flats" are arranged one close to the other since in such a case, they are pushed one against the other and, due to low thickness, they sometimes may become overlapped.

By using the photocells barrier (6) of FIG. 3, double items may be identified relative to the loading stations located on the sorting machines; however it should be appreciated that, due to use of optical barriers, many cases of false double detection may occur, thus resulting in an increased number of the items which need to be handled again, given that, in the absence of confidence, the items are sorted at a special outlet and manually handled. In practice, the presence of doubles and false doubles on the loading station (2) results in incorrect sorting, loss of productivity of the sorting machine, manual work and loss of productivity of the loading station itself, since the procedure of automatic loading of multiple items or false doubles, requires stopping of the conveyor line as well as further operations which are needed in order to safely load the items.

DETAILED DESCRIPTION OF THE SOLUTIONS AND METHODS

The present invention will be hereinafter described with reference to the appended drawings, illustrated by way of non-limiting example, wherein.

Figure 6:
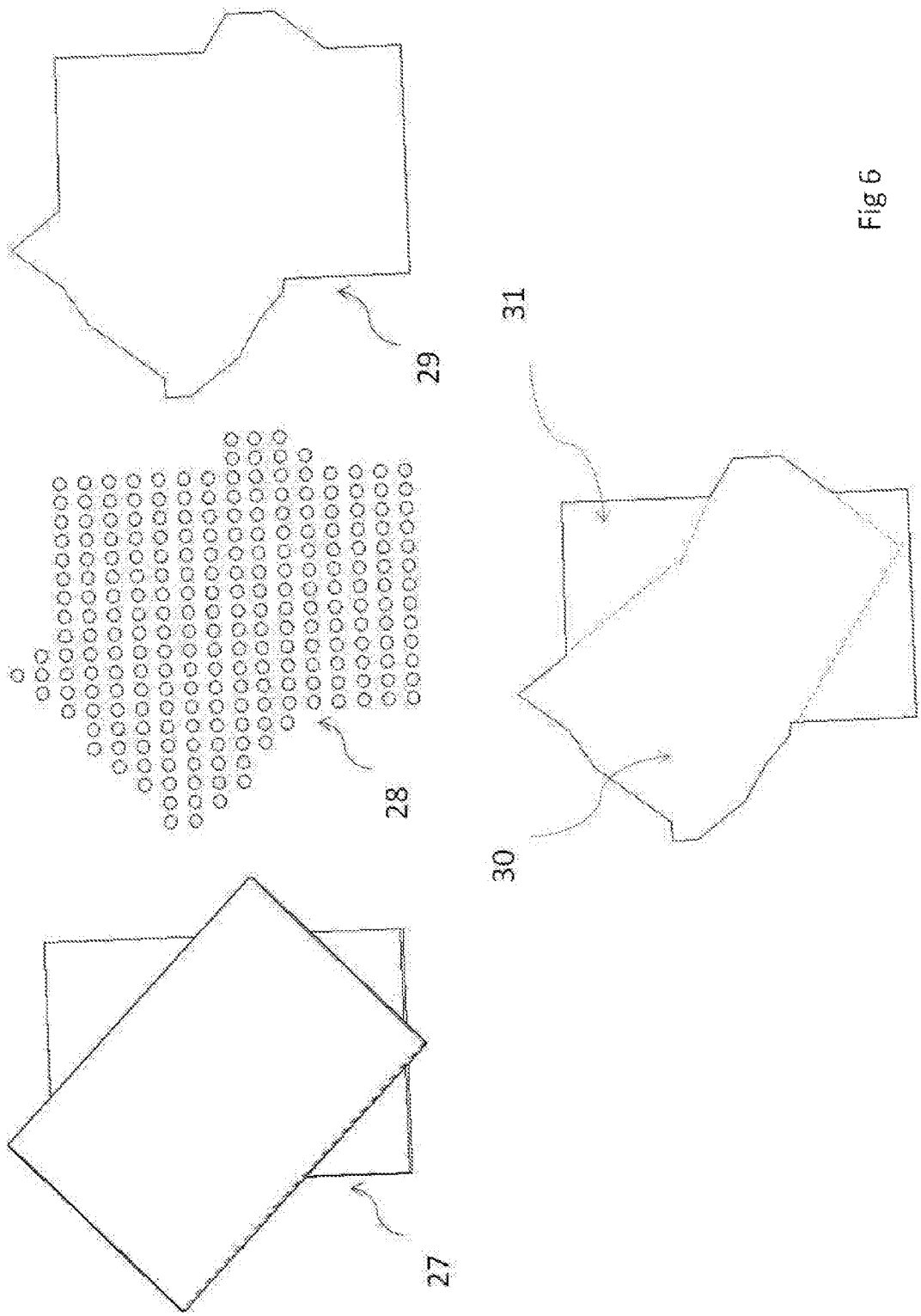
Figure 7:
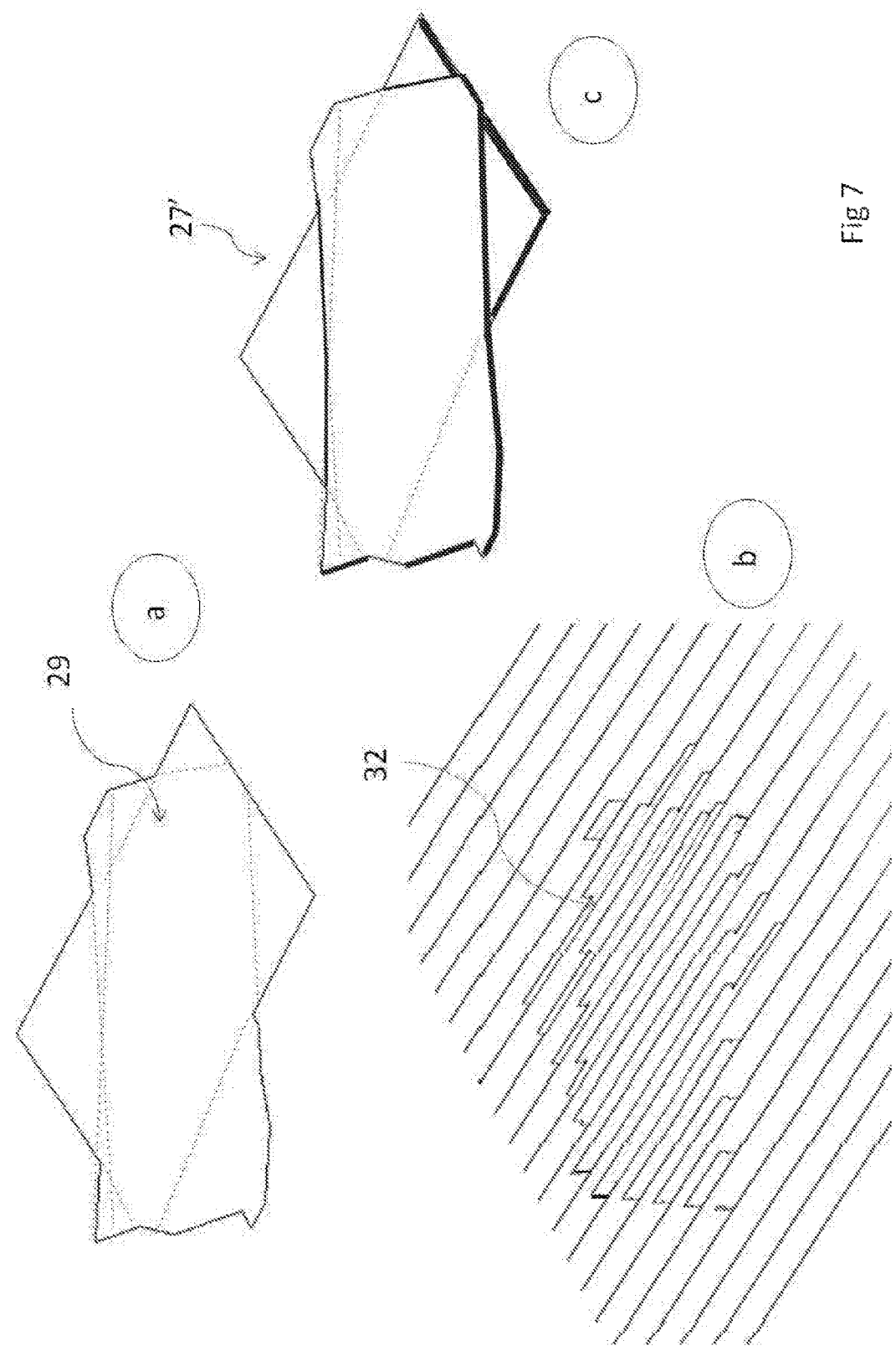
Figure 8:
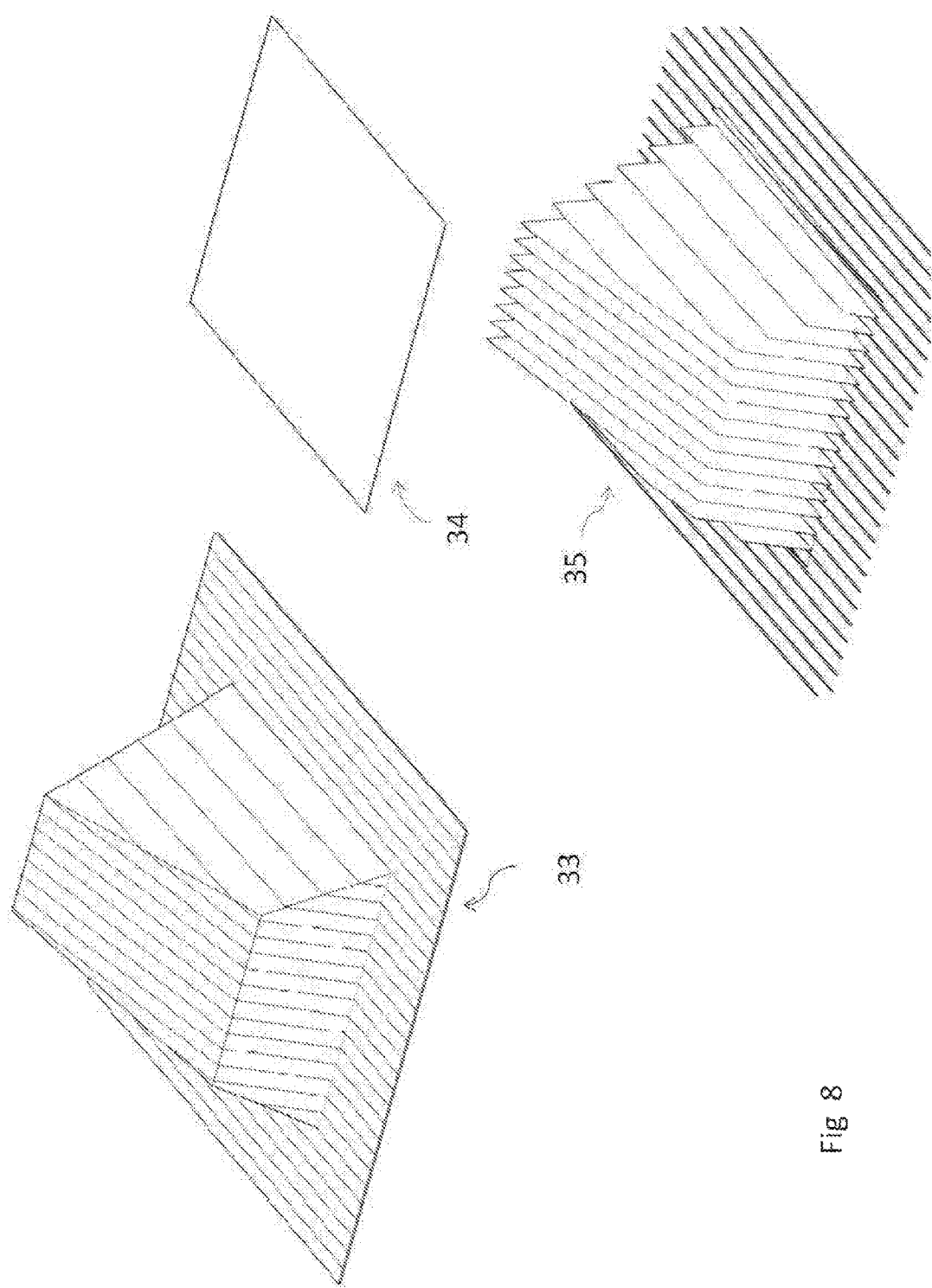
Figure 9:
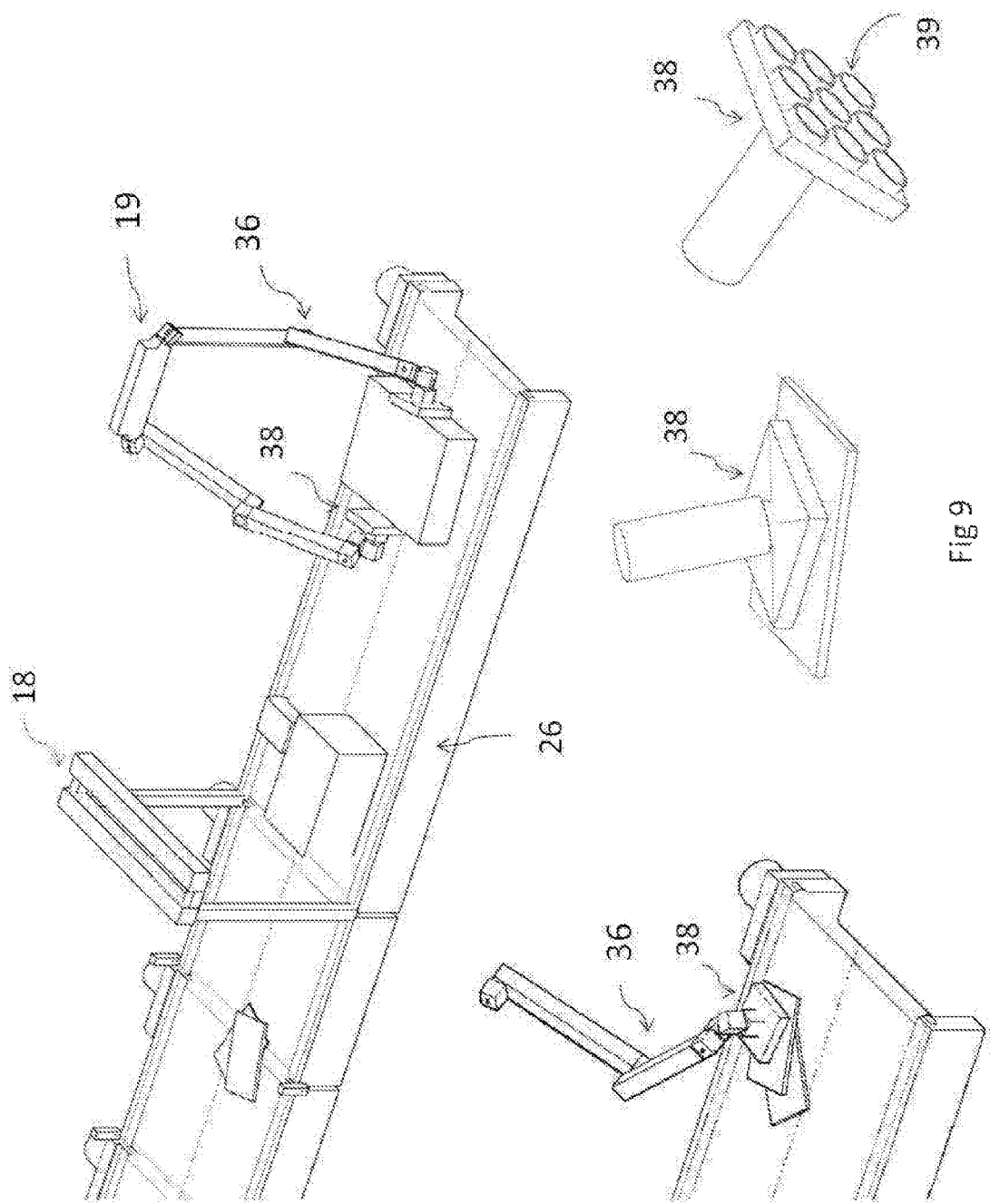
Figure 10:
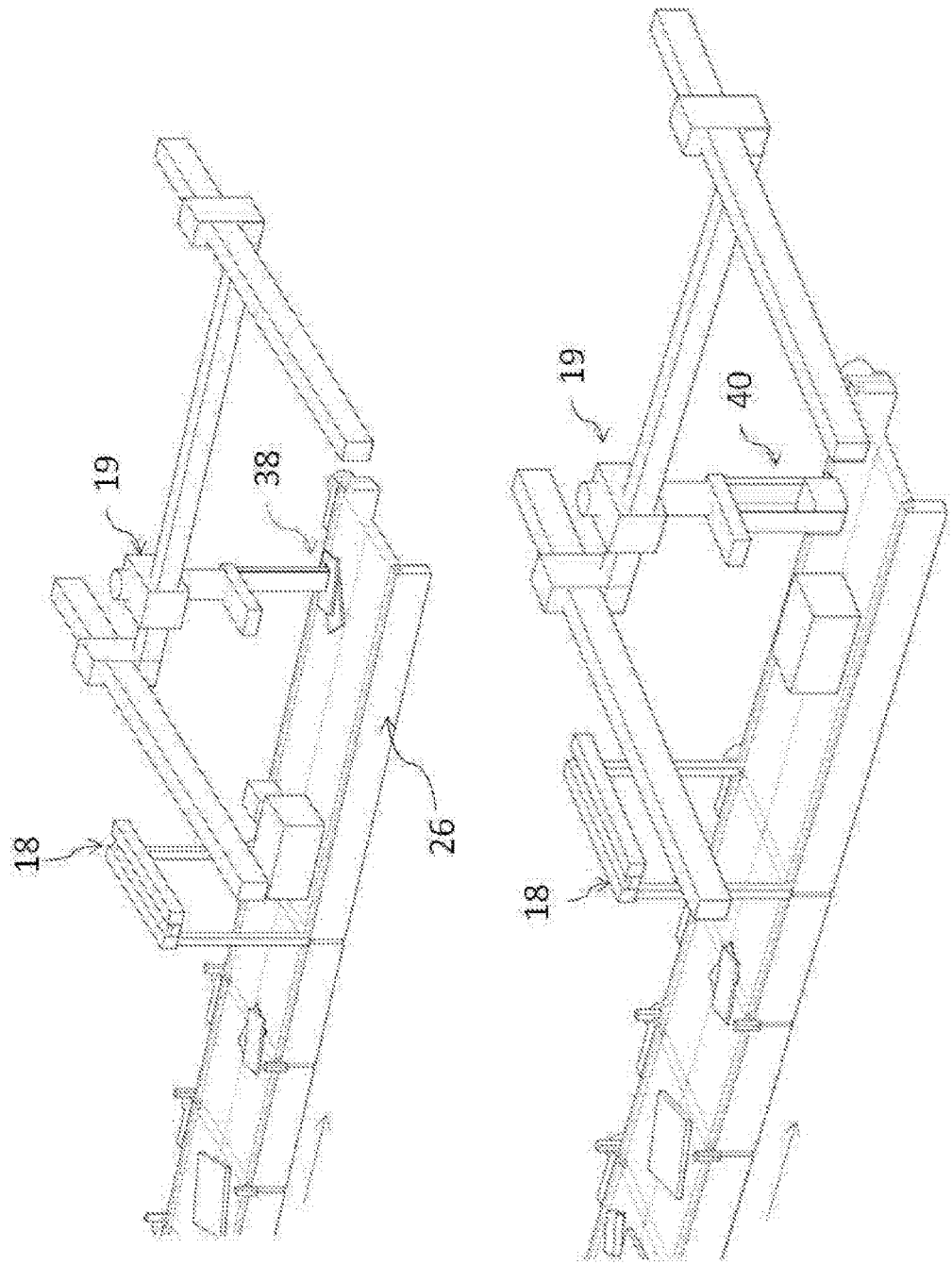
Figure 11:
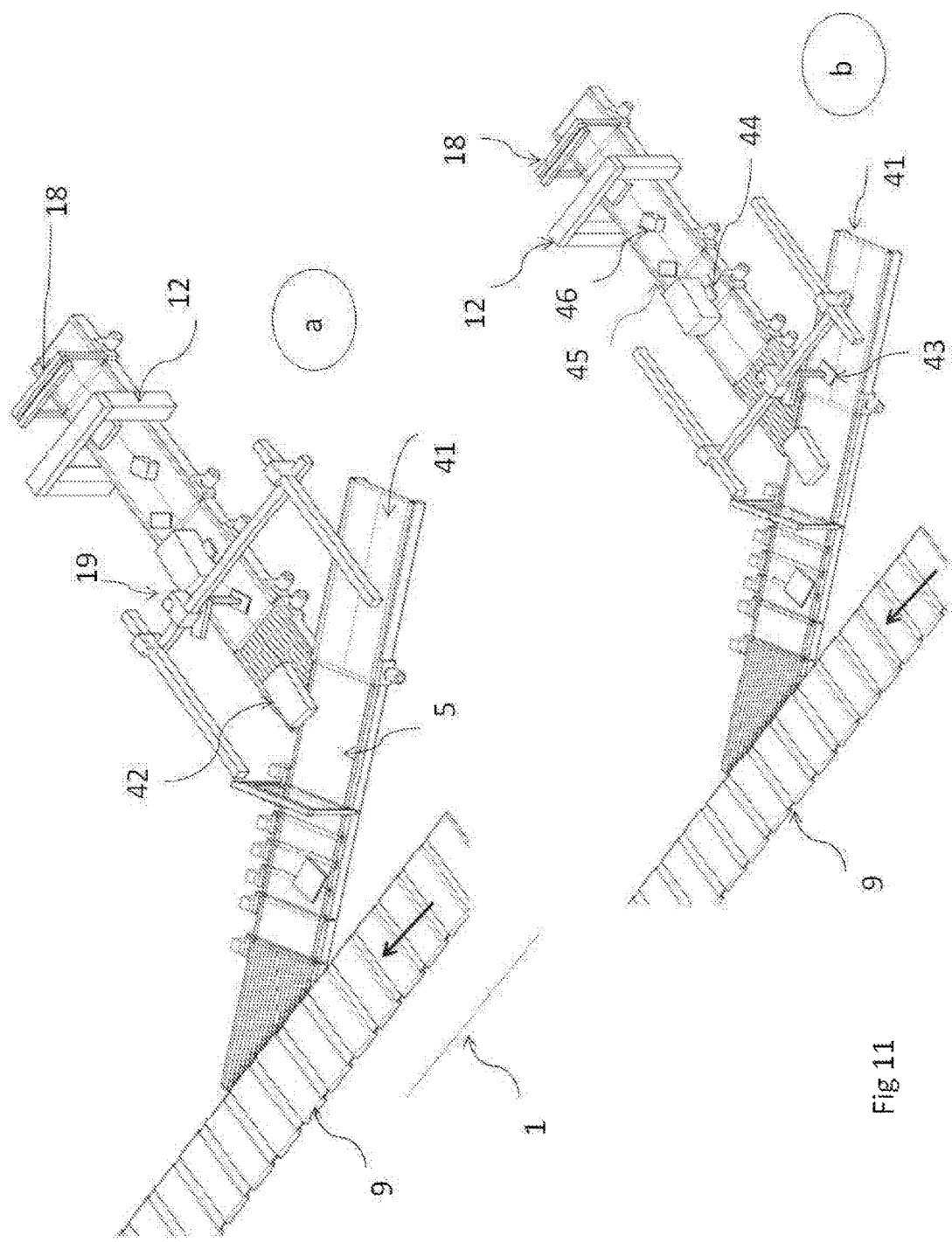
Figure 12:
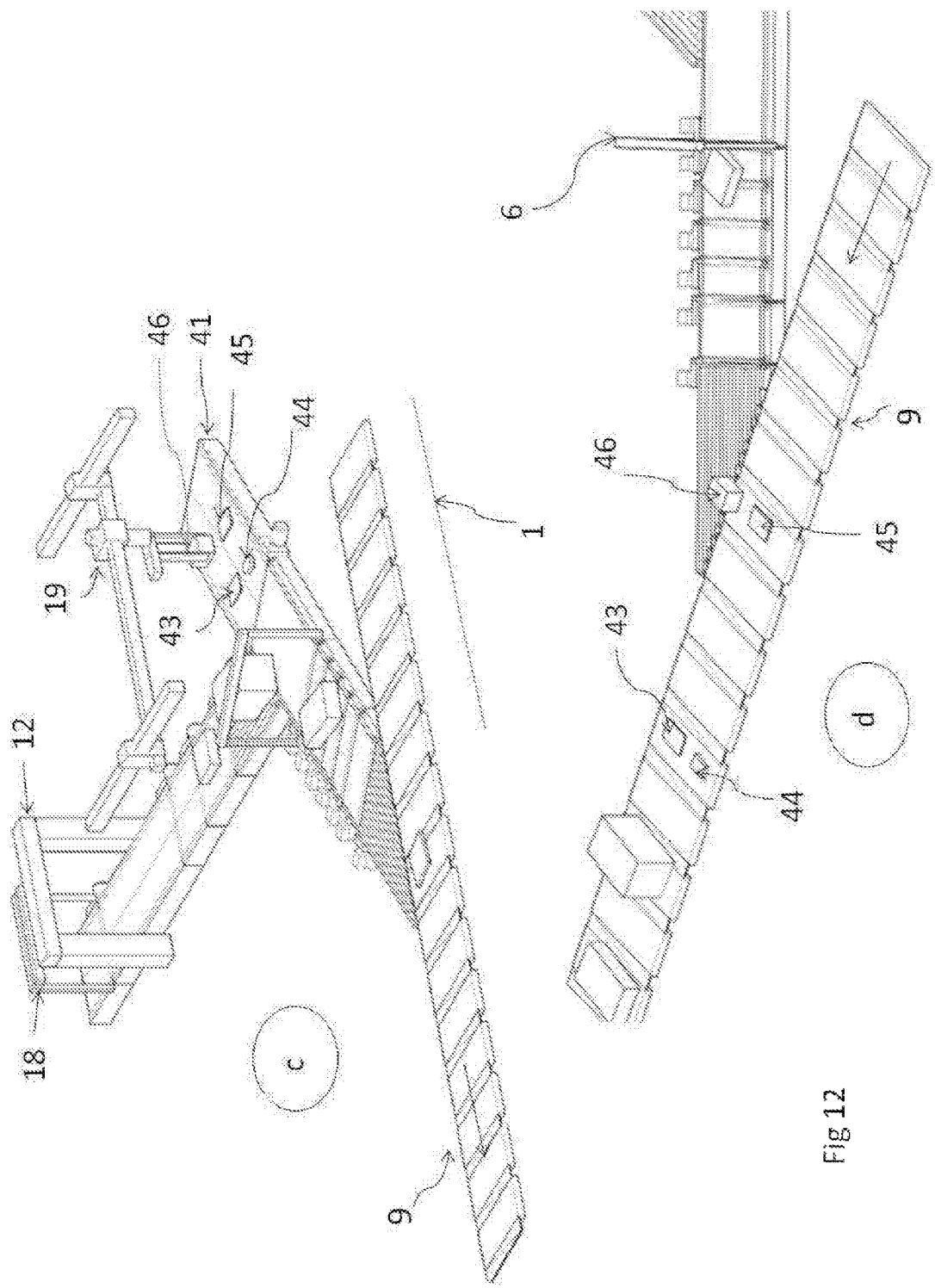
Figure 13:
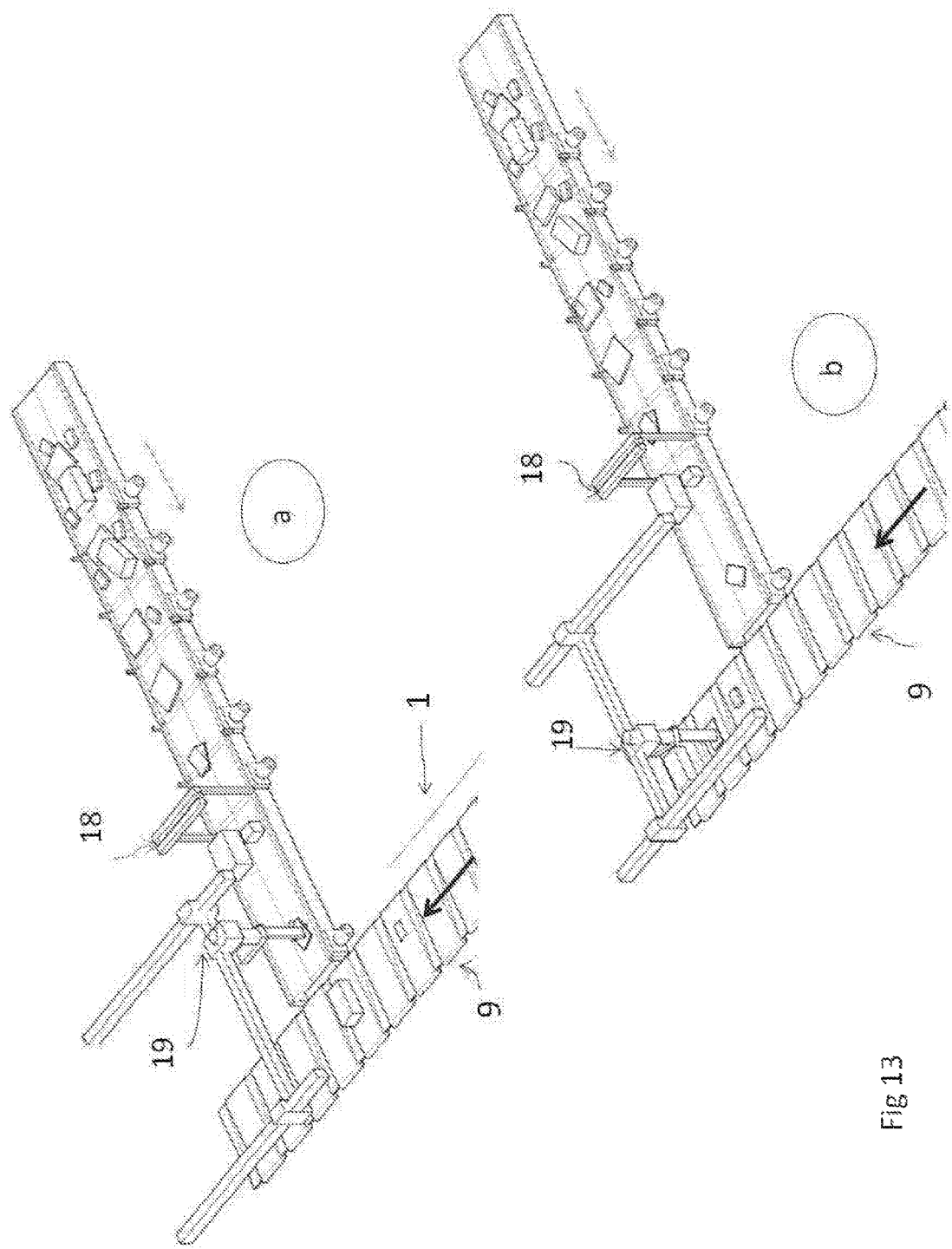
Figure 14:
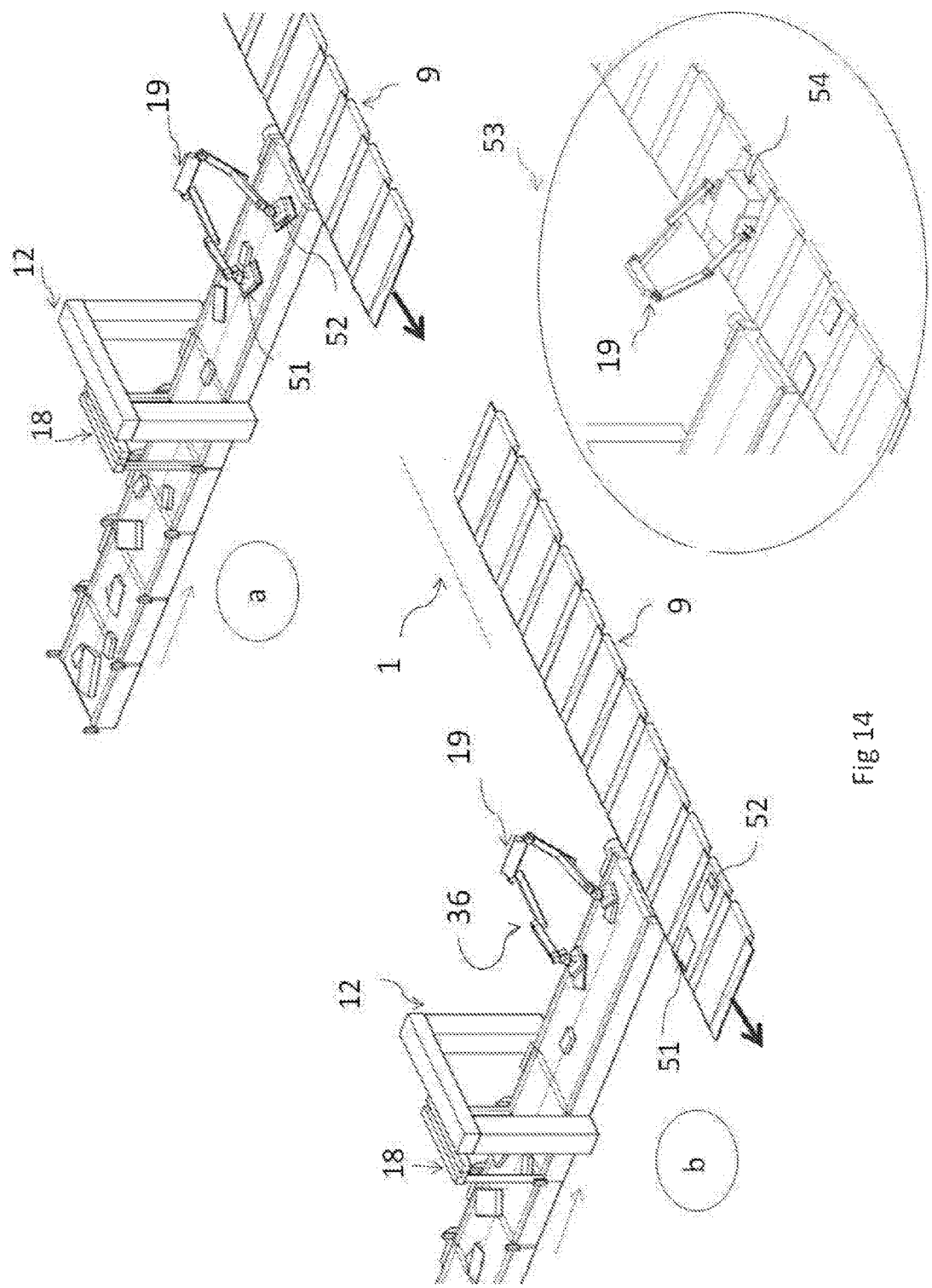

FIGS. 6,7,8 schematically show some data processing carried out within the present invention;

FIGS. 9 and 10 show some practical solutions for the manipulator (19);

FIGS. 11,12 with the sequences (a), (b), (c), (d) show application of the present invention relating to the configuration for the loading of pairs of items of small size on the single sorting cells;

FIG. 13 shows an embodiment relating to the picking up of items and following direct loading onto the sorting cells by means of the manipulator (19);

FIGS. 14 and 15 show further examples of operational sequences according to the present invention.

In order to achieve the aims at obtaining an improved capacity and accuracy of the loading station, while retaining the possibility of handling bulky items, the invention provides integration of vision and robotised pick-up techniques, referred to as "pick and place". These techniques are aimed at picking up small size parcels and flats from the flow directed to the sorting machine, so that the same can be loaded more efficiently thereon; said "pick and place" techniques being further provided for identifying and correcting separating errors that would otherwise limit the capacity of the automatic loading line.

Figure 5:
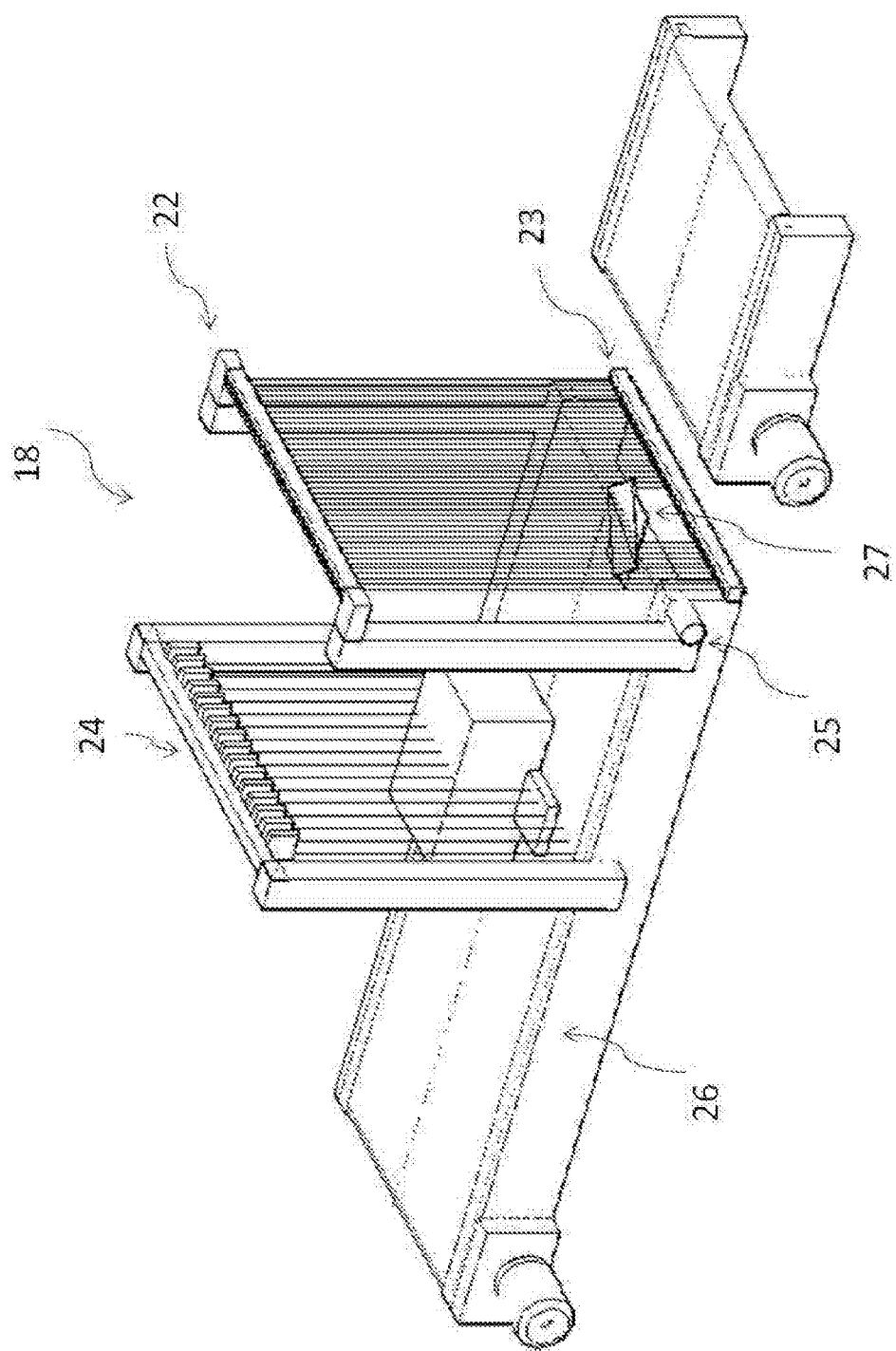
FIG. 5 shows a schematic view of an optical detection device employed in the present invention.

Through a vision system, the automatic analysis of the flow of parcels on a conveyor belt in motion is performed, in order for the single parcels, in particular small parcels and flats, to be identified and measured, wherein data on the presence of multiple items are provided to the control system. The information relating to the parcels positions and dimensions are made available by a tracking system along the whole path on the conveyor belt, whereon a robotic picking device may act. The scanning as well as the analysis shall be three-dimensional and further capable of sustaining a flow of at least 6000 parcels/hour on a conveyor belt at speeds up to 2 m/s, wherein the size of the parcels is that typical handled by couriers. The three-dimensional scanning shall not to be hindered by shadowing-related problems, this means that small parcels, although arranged alongside large parcels, shall be analyzed regularly. Further, in order for the flats, particularly for the partially overlapped flats, to be detected on the conveyor belt, the dimension measures require a resolution of about 1 mm at least, in proximity of the conveyor surface of the belt, whereas the dimension measuring range should be approximately 800 mm. The three-dimensional analysis may be performed based on several techniques of the known type, for example by means of stereoscopic cameras, or by means of cameras analyzing the scanning performed by a laser beam along a direction orthogonal to the direction of travel. In order to meet all the above requirements, the preferred innovative solution for the three-dimensional analysis of the parcels is shown in FIG. 5 and consists in the combination between a high-resolution optical barrier (22) and (23), constituted by photocells in order to accurately determine the projection of each item on the floor, a barrier (24) formed by triangulation laser sensors in order for the vertical outline of the parcels to be measured, and finally a tracking system for accurately locating the position of each parcel at any time during the transport on the conveyor belt. The tracking system allows to correlate the information relating to each individual parcel acquired in different positions and different times and further to make available all information associated with each individual parcel in any position along the transport. The two scanning barriers are installed on a conveyor belt (26), whose advancement is measured accurately via the impulses of an incremental encoder (25) illustrated in FIG. 5. The optical barrier is installed relative to the free space between two consecutive conveyor belts, which free space has been increased in FIG. 5, in order for the photocells barrier to be better identified (23); said optical barrier being constituted by a row of emitters (23) and a row of receivers (22), aligned with respective transmitters. During passing of the parcels, the transmitters are obscured, so the control system, by reading the status of the receivers at each transition of the encoder signal (25), can store the state of the receivers within a vector. Such vectors as a whole, allow to rebuild the projection in the plane of the parcels which are in motion, as shown in the example of FIG. 6 which illustrates two flats being partially overlapped. The resolution is determined by the receivers and encoder pitch, indeed the optical barriers commercially available allow a pitch equal to 10 mm and the encoder may be chosen such that its impulse corresponds to 10 mm of the conveyor belt advancement. In the barrier of triangulation laser sensors (24) of FIG. 5, each sensor allows to continuously measure the portion of an item along the scanning line which is defined by the advancement of the conveyor belt. Each sensor emits a laser beam and measures with great accuracy the angle according to which it receives the laser beam reflected by the point which was hit on the parcel surface. Once the angle is known, an accurate measure is thus obtained of the distance of the point on the parcel surface, wherefrom the dimension of the point is obtained with respect to the surface of the conveyor belt. Particularly accurate sensors are commercially available which have a 1 mm resolution within the measuring range of 1000 mm and which are sufficiently fast, in that capable of updating the measurement at intervals of 5 m/s. While the parcels are passing under the barrier (24), the sensors provide analogue signals corresponding to the scanning of the parcels surfaces along the lines defined by the position of the sensors, as shown in the detail (b) of FIG. 7. The analog signals of the sensors may be sampled at a 20 mm pitch, corresponding to two pulses by the encoder or to an interval of 10 m/s, where the speed of the conveyor belt is equal to 2 m/s. The digital conversion of analog signal samples provides data which are stored in vectors associated to the encoder transition, i.e. all data contained within above vectors, which are ranked according to the advancement measured by the encoder pulses, allows to re-build the vertical outline of the items. The tracking function of the parcels and related information on the conveyor belt, allows the control system to know the position of each parcel at any time, and to access to the data thereof, in order to read stored information, or to add new available information. The tracking is a core function for the processing functions related to the vision and to the controls for the robotised picking of parcels and flats, object of the invention herein and described hereinafter. The preferred solution for the tracking provides assembly of a virtual belt which shall exactly correspond to the real belt and be constantly synchronized with the latter, owing to the encoder (25) measuring the belt elementary advancements. The virtual belt consists of an ordered set of data structures corresponding to elementary cells wherein the real conveyor belt is divided, i.e. the number of elementary cells is given by the length of the conveyor belt divided by the pitch of the encoder, for example: a 2 meter long belt shall have a corresponding virtual belt consisting of 200 data structures considering an encoder with a 10 mm pitch, that is to say, an encoder which signals the elementary advancement of the 10 mm belt with one pulse.

Logic states vectors of the scanning optical barrier, word vectors of the triangulation sensors barrier and still further information such as the synthesis of images three-dimensional analysis, the parcel destination and other information available about the parcel, may be stored within the data structure of the single cell.

When a parcel is incoming at the conveyor belt inlet, data thereof are stored within the first data structure of the virtual belt and, at each pulse by the encoder, the data contained in a single data structure are transferred to subsequent data structure. Thus, the virtual parcel, consisting of information related to the parcel, moves along the virtual conveyor exactly in synchronism with the real parcel on the conveyor belt. Along the way, any further data possibly available related to the parcel, may be added to the virtual parcel. During the scanning of the photocells barrier (22) and (23), which is placed at the beginning of the belt, the logic states vector corresponding to the barrier sensors, is stored within the first data structure that corresponds to the cell belt element which is arranged below the barrier. This information is advanced to the next cell, relative to the new pulse encoder, thus the scanning information obtained in synchronism with the encoder, advance along the virtual belt exactly in synchronism with the real parcel. Similarly, the words vector obtained by sampling the sensors of the barrier (24), is stored in the structure that corresponds to the belt element located exactly below that barrier. Owing to the synchronism between the real conveyor and virtual conveyor, once the optical scanning states reach the cell that corresponds to the position of the triangulation laser sensors barrier, the real parcel reaches the latter, thus, within the cell of the virtual belt, to the bi-dimensional scanning states, there are now added in synchronism the data arising from the sampling and digital conversion of the signals coming from the laser sensor three-dimensional barrier. In this way, once the three-dimensional scanning barrier (24) has been overcome, the optical scanning data, as well as the three-dimensional scanning data shall be aligned within the cells of the virtual belt and such data shall move along the virtual belt from one cell to the next cell, in synchronism with the real parcel. Each virtual parcel are then associated with the data resulting from the processing for the three-dimensional synthesis of the scanning performed on the real parcel. After the virtual parcel has passed under the bar code-reading tunnel (12), the corresponding sorting destination and possibly further known data such as weight and volume, are then associated to it.

FIG. 6 shows the steps of the bi-dimensional analysis performed on the data structures produced by the optical barrier (22) and (23), i.e. the set of points (28) arising from the receivers shadowing, corresponds to the bi-dimensional view from above of an item (27) in motion, in the particular example of the figure, the item is constituted by two partially overlapping flats. The image is referred to a bi-dimensional Cartesian system, i.e. along the X axis, the transverse position on the belt is measured, and then the positions of the 10 mm pitch optical receivers are shown, while along the Y axis, the encoder pulse-based advancement of the conveyor is measured, finally the states of the sampled receivers appear at intervals of 10 mm.

Via image processing techniques of the known type, the outline (29) points of the item can be determined. Thus, two distinct items arranged in parallel on the conveyor belt can be easily identified since they exhibit two separate regions defined by the two outlines. Each single identified item is then associated, within corresponding virtual parcel, with summary data obtained from image processing, i.e., the coordinates of the barycentre of the cited item, the rectangle inside which the same is comprised, and finally its orientation within the coordinate system.

Further, based on image analysis techniques of the known type, complex outlines may be identified and processed, wherein hidden lines can be highlighted to which partially overlapped flats could correspond, as shown by the outlines (30) provided in FIG. 6. In this case, by means of analysis techniques, the possible outlines of two flats (30) and (31), may be identified, which outlines shall be possibly confirmed on the basis of the correlation with the data obtained from the scanning of the subsequent three-dimensional barrier (24). Relative to the scans of the laser sensors barrier, as already described, owing to the data synchronization, it is possible to correlate the bi-dimensional outlines of the two presumably overlapped flats with the actual dimension variations resulting from the three-dimensional scanning.

In particular, the discontinuity in the dimension measures provided by the bi-dimensional image analysis which occurs relative to the hidden lines, allows to increase the confidence level, when effective presence of overlapped flats is determined, thus further allowing to establish which of the two items is in the most suitable position for being picked up by a "pick and place" manipulator.

The example of FIG. 7 illustrates the bi-dimensional optical analysis providing hidden lines which supplement identification of two separate flats, as shown in the detail (a). Relative to the contour lines provided for the item (29), the three-dimensional scanning of the detail (b) shows dimension (32) discontinuities, which discontinuities allow to confirm presence of two partially overlapped flats, and further that the item (29) is in the upper position, thus being the first one to be picked by the "pick and place" manipulator, as shown in the detail (c).

Furthermore, the three-dimensional scanning is used to determine the most suitable zone for performing items picking within the outline (27'), which zone is characterized by low dimension discontinuities. Absent discontinuities related to the dimension measure along the outlines of the proposed bi-dimensional analysis, the presence of a single item exhibiting a particular form, shall be instead confirmed. For each identified parcel, within the data structure of the virtual parcel, following data shall be stored: the barycentre coordinates, the coordinates of the rectangles vertices wherein said identified parcel is comprised, the three-dimensional coordinates of the picking point center and those of the rectangles vertices determining the picking zone characterized by a reduced dimension variation.

As for the parcels exhibiting a suitable height for lateral picking, a three-dimensional representation of the parcel is obtained, in order for the upper and lateral faces thereof to be identified, wherein measures are provided on the basis of which the control system operates the manipulator (19) for selective picking and placing of the parcel.

The upper face is identified as a zone characterized by a low variation of the dimension value, whilst the lateral faces are determined based on identification of large variations in the dimension value, occurring relative to the coordinates by which the outline is defined. Thus, vertical faces can be identified, which are suitable for picking the item in opposition or in alternative, inclined faces are provided, which are characterized by lower values in terms of variations of the dimension value along the outline, and thus less suited for performing picking of the item in opposition.

Once the vertical faces related to the outline have been identified, it is possible to determine the coordinates of the vertices of the faces and the measures of the sides, and hence the coordinates of the picking rectangle at the center of each face.

From the processing thus arises a synthetic three-dimensional representation of the parcel, which is stored within the data structure of the item in motion on the virtual belt, in synchronism with the real parcel. Owing to this tracking solution, as already discussed, the information needed by the control system for handling the manipulator when the individual parcel is being picked up, shall be accessible in any position of the conveyor belt (26).

There are known and commercially widespread, manipulators (19) of the type "pick and place" with suction from above, or provided with a gripper which performs a picking in opposition on the sides of regularly-shaped parcels, or supplied with two independent robotic arms (36), which are so synchronized as to exert a counter-force on the sides of the parcels, or pick up flats independently via suction elements (38). All the systems above described, may be advantageously used for the purposes of the present invention. Owing to the robotic picking, and based on the information associated with the virtual parcel, object of the tracking and thus perfectly aligned to the real parcel, flats and parcels can be picked up from the conveyor belt, furthermore any drawbacks due to double items, may be overcome.

Figure 4:
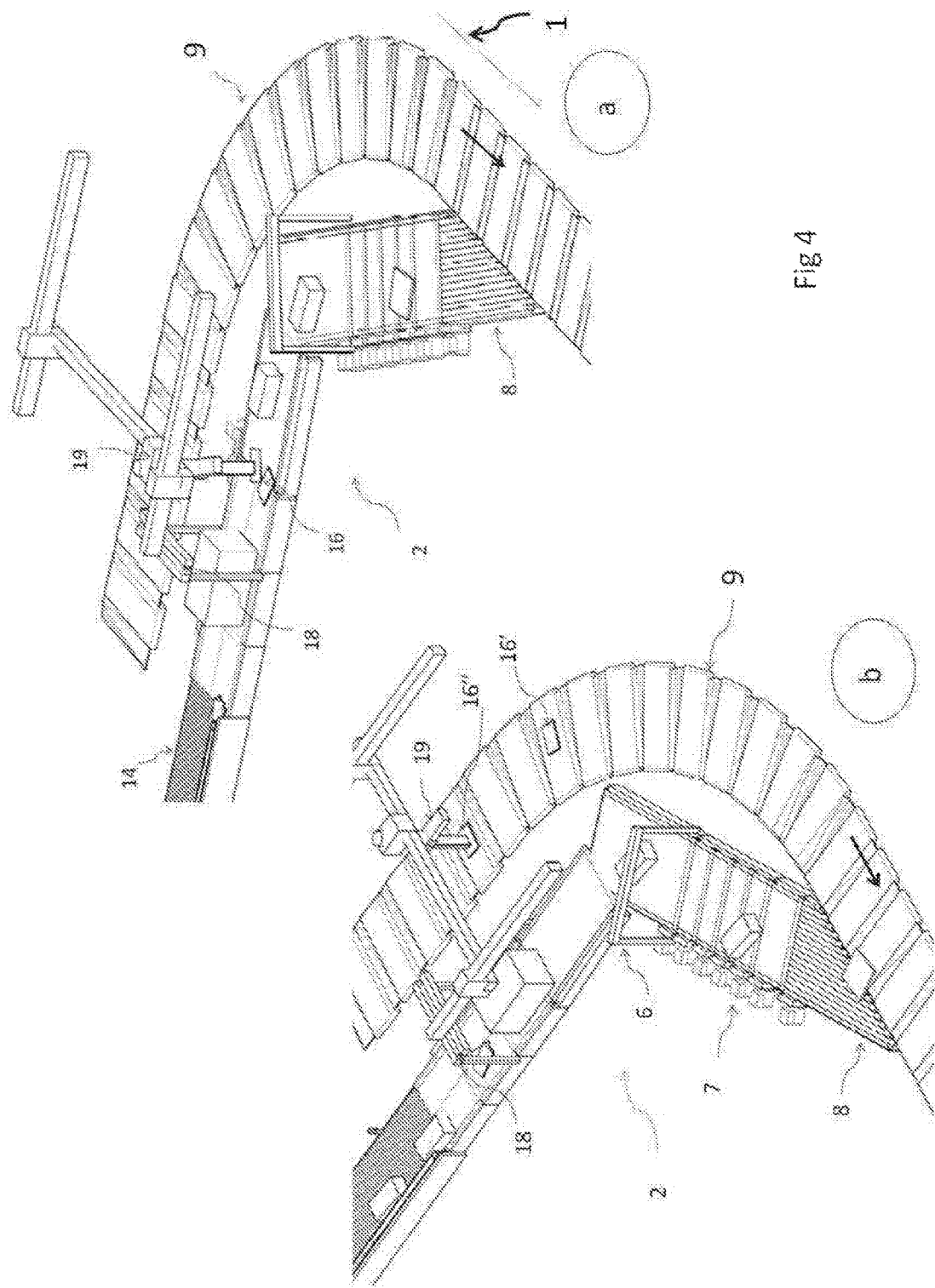
FIG. 4 shows an example of how the present invention applies when partially overlapped items are picked up from the conveyor belt and placed onto the sorting cells of the sorting machine.

A first aspect of the present invention is shown in FIG. 4, with the manipulator (19) being adapted to remove flats and parcels from the conveyor belt which feeds the automatic loading station (2) on the sorting machine, wherein drawbacks due to double items are simultaneously overcome. The parcels or flats which were picked up, may be loaded directly onto the sorting machine cells according to encoder-based synchronization techniques of the known type, between the manipulator and the carriages, or the moving conveyor belts, whereon the parcels are placed. In this way, not only it is possible to overcome drawbacks due to double or overlapping items, wherein efficiency losses of the loading station become reduced, but, owing to this solution, the loading capacity becomes increased, and the task is left to the station (2) to load large parcels or parcels, whose geometrical characteristics are such that the robotised picking becomes unsafe. This first innovative application, further detailed hereinafter, is shown in FIG. 4 which shows an automatic loading line (2) provided with a bi- and three-dimensional scanning system, simply indicated by the numeral (18), but comprising the optical barrier (22) and (23) and the triangulation sensors barrier (24) of FIG. 5. FIG. 4 shows operation of a generic manipulator (19), in this case, as a simple example, a Cartesian "pick and place" system.

In the sequence (a) of FIG. 4, two partially overlapped flats (16) were identified, wherein the manipulator picks up the two flats from the conveyor belt in motion by performing two consecutive actions, while the sequence (b) shows the result of the operation: i.e., the two distinct flats (16') and (16") are loaded in an oriented manner onto separate cells of the sorting machine. The large size parcels and those which prove to be difficult to be picked up based on the three-dimensional analysis, are left on the loading line in order to be loaded onto the sorting machine in a conventional manner.

FIG. 9 illustrates solutions in terms of pneumatic depression picking of the item (38) and picking in opposition, occurring via independent, but opposition-based synchronized robotised arms (36), which robotised arms (36) act on the items in motion on the conveyor belt following the three-dimensional analysis of the barriers (18). The possibility for the pick and place manipulator of acting on parcels in motion on a conveyor belt, is known; the reference system for the item picking is in this case movable and synchronized to the movement of the conveyor belt through an encoder which signals primary advancements of the belt. The tracking system previously described further allows to access to the parcel and to all information thereto related with accuracy, no matter where it is located along the conveyor belt. The preferred solution for the pneumatic depression-based item picking, is shown in FIG. 9 and consists of an articulated wrist (38), which is able to be oriented relative to the arm in order to perform picking of the item even on non-parallel faces with respect to the support surface; the articulated wrist (38) being provided with suction cups (39) which are independently operable with sectors and individually enabled to suction when coming into contact with the item surface, so as to better adapt to the picking zone provided. FIG. 10 shows another possible solution providing a Cartesian robotic arm which is suitably equipped for performing pneumatic picking (38) from above, and further provided with a gripper so that the item can be picked up in opposition (40) through a movable wall.

It should be noted that the items handled within the flow of a courier can vary widely; certainly flat and small items with parallel faces constitute the majority of the products handled, although items with special forms and packaging are also handled, as visible by way of example in FIG. 8 which shows an item whose faces are all inclined as the result of a special packaging. The projection in the plane of the analysis of the optical barrier (34) shows a single regularly-shaped item, although based on the analysis resulting by the three-dimensional scanning (35), it is found that the side faces thereof are inclined. Apart from the picking of the item in opposition, it only remains the possibility of performing pneumatic depression-based picking on the upper face. Picking the item from the upper face thereof, obviously implies limitations as regards the weight of the item itself. Indeed, in the absence of information on the weight of the item, the picking from above becomes restricted to small items only, alternatively the item remains on the belt for the purposes of automatic loading by the loading line (2). The example shows how the intervention of the robotic arm is established on the basis of variables, some of which, as the dimensions, are known and some other, such as the weight, are not necessarily known. Furthermore, given the extreme variety in terms of shape and weight of the items handled, picking the item in opposition implies to know the force to be applied thereto, in order to prevent any possible slipping, and contextually to not damage the item which is being handled. Thus, it can be assumed that the force exerted in opposition and such as to not cause any damage resulting from crushing, is proportional to the weight of the parcel, such that the friction generated when the parcel is being picked from its sides, is sufficient for lifting thereof. However one should also consider the general case in which the weight of the parcel is not known. Here, the robotic arm which performs picking of the item in opposition, shall be able to measure and adjust the force exerted by measuring the possible initial sliding of the parcel with respect to the picking position. Thus, the manipulator (19) is provided with sensors which are apt to accurately measure the distance between the parcel and the picking device, so that during the picking and the initial lifting, the relative movement of the parcel with respect to the arm can be determined, and likewise the force exerted in opposition becomes increased in order for the relative movement to be stopped. Further, in order to have safety margins, the automatic adjustment of the force exerted in opposition for preventing the item from slipping, is performed by imparting to the item self an initial acceleration upwards, thereby becoming increased the weight force which acts on the parcel according to a known manner. The measure of the relative movement between the robotic arm and the item is also used for the pneumatic picking from above, so that the risk is reduced of loosing the picking during the subsequent movements. Following description of the above retroactive control mechanism, a possible interruption of the action should also be considered, wherein the parcel is left on the belt in order to be loaded by the automatic station when the measurements of the force applied and relative movement between the parcel and the picking device, do not provide a sufficient confident range. During lifting, the control system of the robotic arm is able to contextually measure the weight of the item, wherein this function is provided by measuring the currents within the motors of the arm, thus being ascertained suitability of the picking force exerted in opposition with respect to the weight of the item.

The arrangement of FIG. 4, showing the sorting machine (1) and the loading line (2) arranged side by side, is particularly advantageous since it allows to the pick and place manipulator (19) placed therebetween, to remove flats and parcels from the feeding line and to load them directly onto the cells of the sorting machine. Owing to this arrangement, the pick and place manipulator is further able to solve the cases of parcels arranged side by side as well as those of partially overlapping flats. In this way, the automatic loading line is left the task of loading heavy items, or large and irregularly-shaped items which may jeopardize safe picking.

This integration allows to increase overall load capacity of the line, to eliminate any sorting errors, as well as to overcome the need of re-working, due to the presence of parcels or double flats or to detection of false double items. The removal of flats and parcels from the feeding line of the loading station (2), results in a reduction of the flow but, owing to the tracking system, it is possible to know the density of the residual parcels and thus to increase the speed of the conveyor belts located upstream, so that the automatic loading line can receive a flow of parcels to be loaded, via which, the full loading capacity of the line may be exploited. In this way, the overall loading capacity is given by the sum between the capacity of the pick and place manipulator, which operates on parcels and flats, and the capacity of the loading line, which operates on parcels and other items difficult to be picked up. Difficulties in terms of recognition of the bar code on parcels and flats for the purposes of sorting at destination, should also be noted. Indeed, in the case of two partially overlapped flats, it may happen that the bar codes of the flats are not detectable by the reading tunnel (12). In such cases, the two flats are handled like the others, but the sorting destination thereto assigned, corresponds to a particular outlet on the sorting machine, where items shall be processed manually for then being encoded and loaded again onto the sorting machine. With reference to applications providing large quantities of flats to be handled, there may be frequent cases of partially overlapped doubles, potentially resulting in a high rate of items be sent to manual re-working due to failure in code detection. In such cases, the pick and place manipulator may be provided with solutions aimed at identification of the bar code. For example, next to the operating position of the manipulator (19), there may be provided a temporary supporting plane provided with bar code readers, such as a pair of conveyor belts adapted to read on both faces of the flats. Once the destination has been obtained, the manipulator provides for recovery of the flat for loading it onto the sorting machine.

Figure 1:
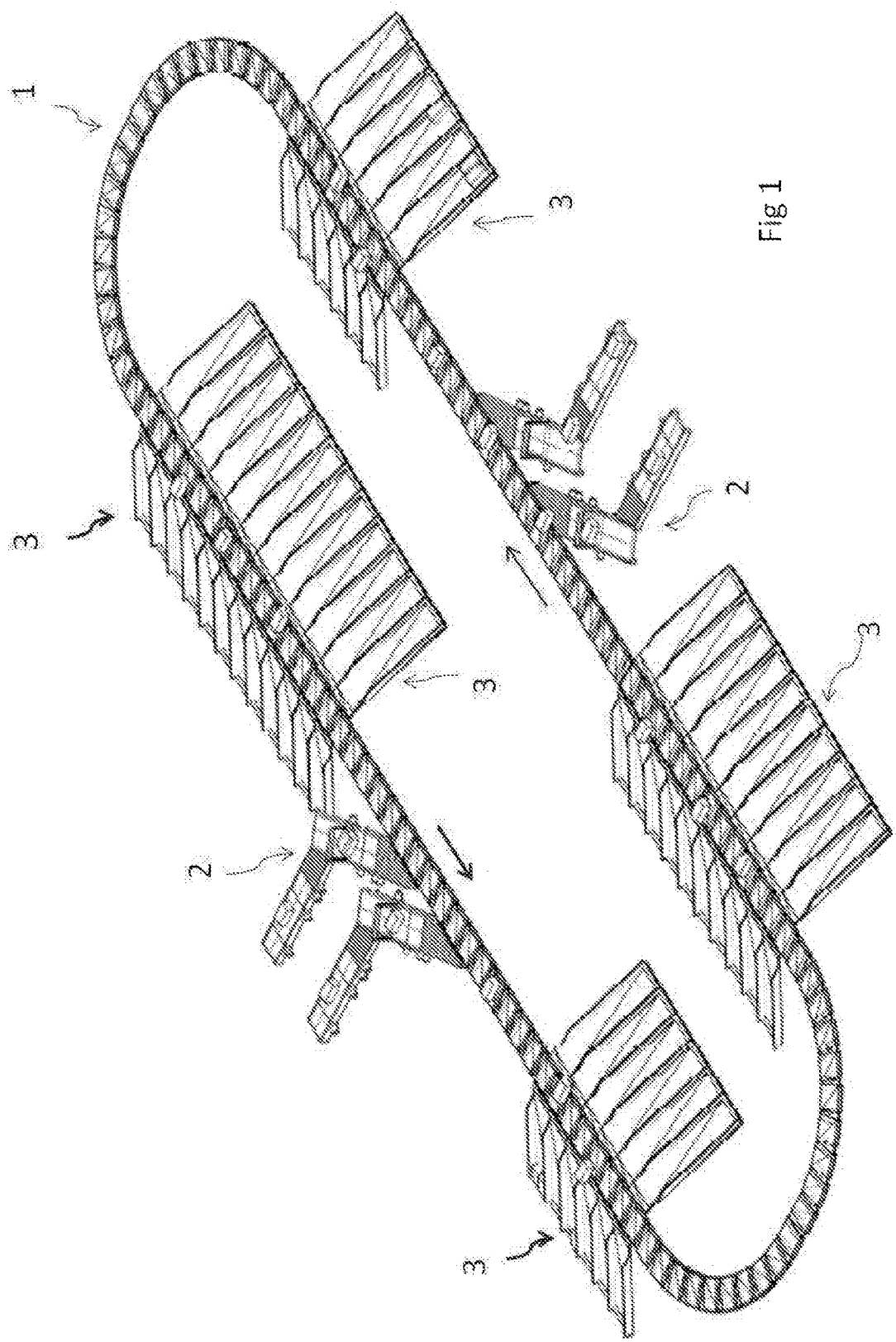
FIG. 1 shows a schematic view of a plant for the sorting of items.
Figure 2:
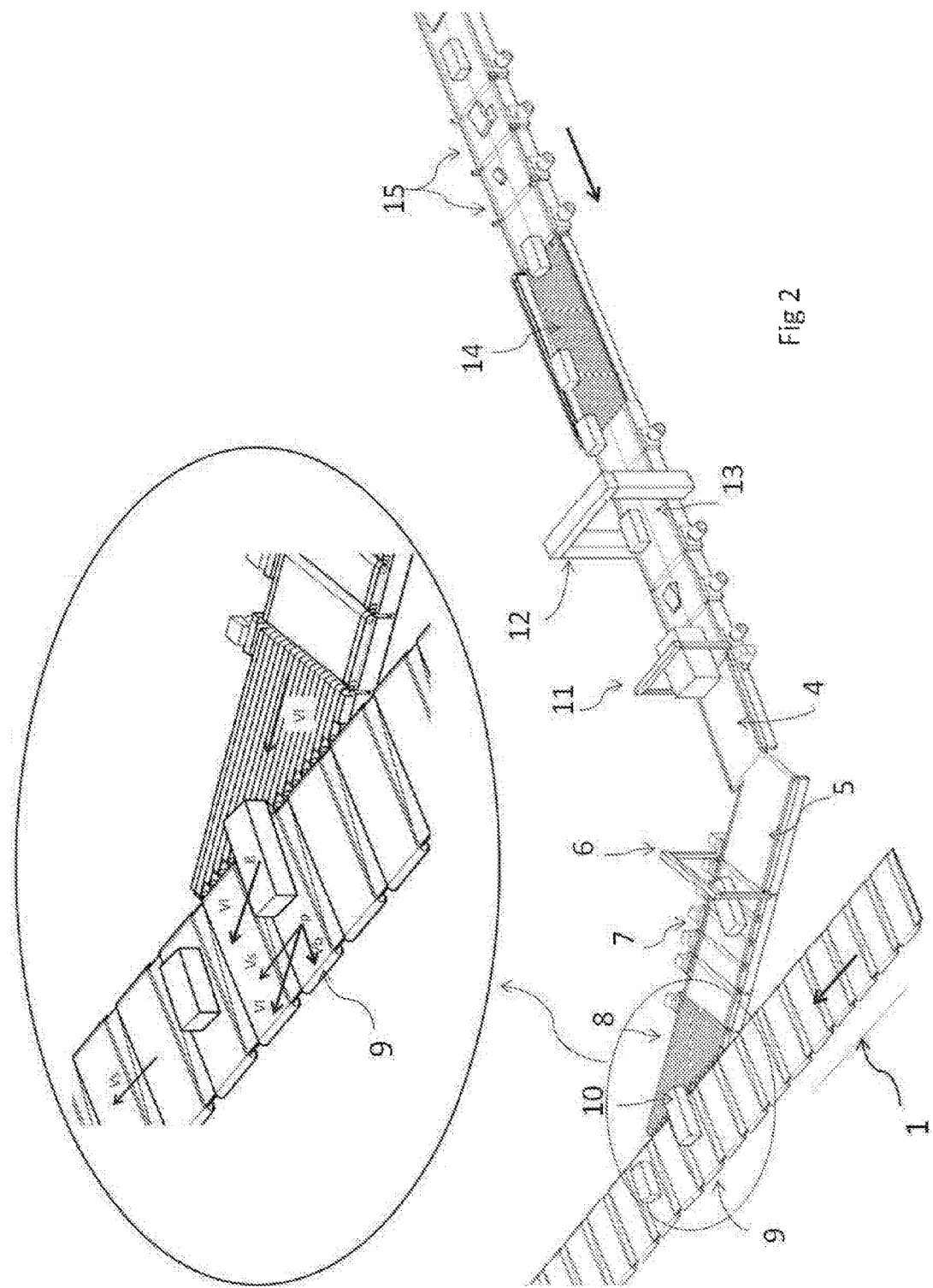
FIG. 2 shows a schematic view of a zone of the plant of FIG. 1, comprising a station for automatic loading of the items.
Figure 3:
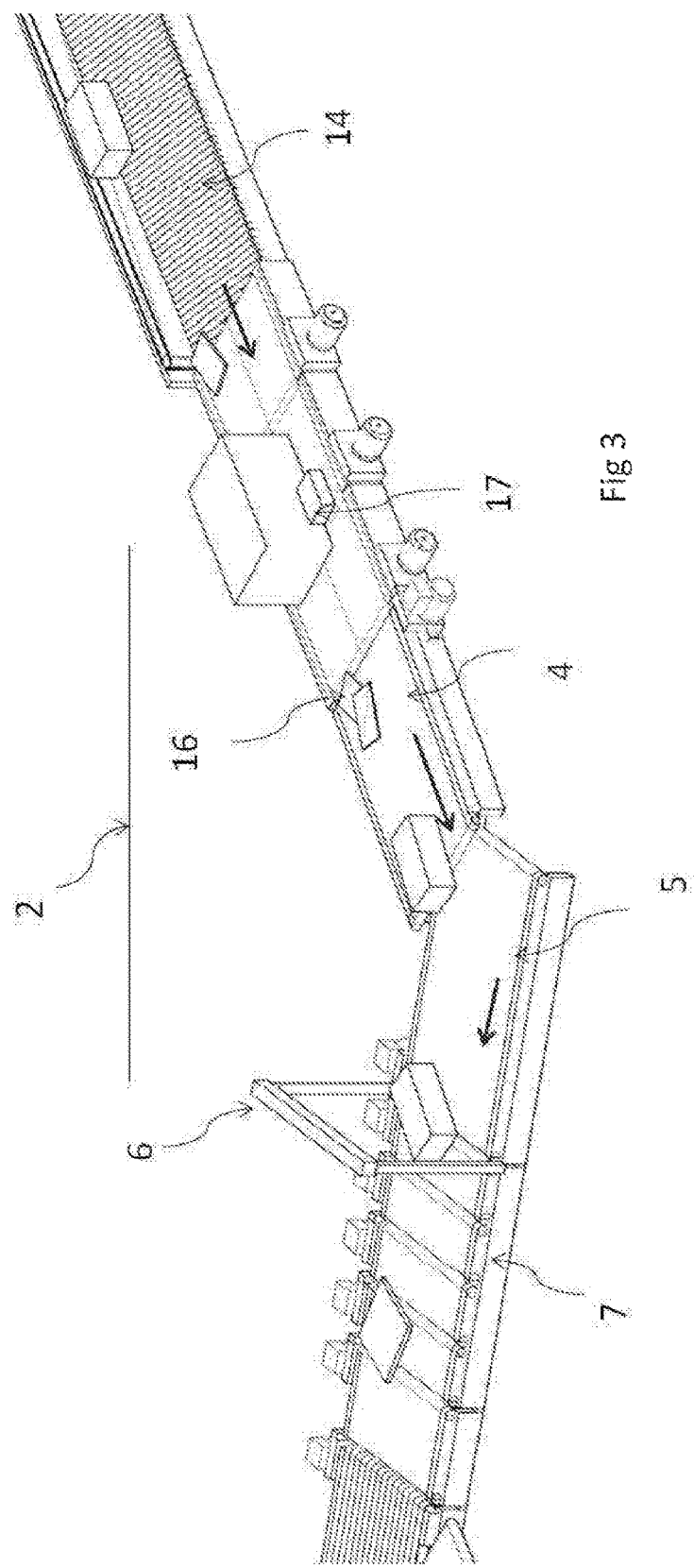
FIG. 3 shows a further view of the zone of FIG. 2, in which there are shown two examples wherein items fail to separate one from the other.

An innovative application provides integration of the vision and robotics functions herein described, with the cross belt sorting machine, which is able to handle two flats or small parcels on the same cell, according to patents EP 0927689 and EP 0963928. According to the patents cited, two items may be loaded onto a single cell of the cross belt sorting machine, which cross belt sorting machine is divided into two logical zones, due to the fact that the conveyor belt of the cell has a length of 1500 mm in order to be able to perform loading and sorting of large size items as well. The principle on which the cited patent is based, provides that two items to be sorted may be virtually always arranged according to the unloading priority, so that both of them can be sorted from a single cell within the same machine cycle, thus increasing productivity of the latter. For example, assuming that the destinations of the two items are both on the right side in the direction of travel, the item which was first sorted, shall be loaded onto the right cell, whereas the other one shall be loaded on the left. The only exception to the possibility that both items can be directly sorted within the same machine cycle, provides the case wherein two items have corresponding destinations next to one another while being opposed one to the other on the two sides; in such a case only one item can be sorted, the other one shall be sorted in the next machine cycle. However, considering that a parcels sorting plant is provided with at least a hundred destinations, the low probability of the event entails a negligible loss of productivity. As already discussed, the items with dimensions up to 500×400×400 mm constitute 60% of all the products handled, therefore, assuming that all of these products can be loaded in pairs onto individual cells, there would be an increase in the capacity of the sorting machine equal to 60%. The cited patents provide solutions aimed at varying the arrangement of a pair of items during the loading step, so that subsequent separate loadings of the items onto the same cell, help them to be arranged in the correct order so that they can be sorted at respective destinations. By integrating the vision and robotics functions described above, the present invention provides instead to arrange correctly ordered pairs of items directly onto a conveyor belt (41) as shown in FIG. 11, which conveyor belt (41) was added to the loading line located upstream of the conveyor belt (5); said pairs of items shall be sorted, disposed and oriented in such a manner as to be loaded directly onto the sorting cell (9) as if they were a single item. FIGS. 11 and 12 show preparation of pairs of items on the conveyor belt (41); the pairs of items are indicated by the numerals (43) (44) and (45) (46). The sequence (d) of FIG. 12 shows placing onboard of a cross-belt cell of the pair of parcels (45) (46), arranged by the pick and place manipulator on the conveyor belt (41) so as to be contained within a rectangle with faces parallel to the cells of the sorting machine, as shown in the sequence (c) of FIG. 12. As shown in the sequence (d) of FIG. 12, the cross-belt load, whose relative speed components are null with respect to the belt of the sorting machine already illustrated in detail by FIG. 2, ensures an accurate transfer of the two items onboard the cell, as if they were one unique large size item, while exactly maintaining orientation and distance one with respect to the other. The separation between the parcels, corresponding to at least 400 mm, further ensures that, upon activation of the cell belt, one item only is sorted, wherein the belt is decelerated such that the second item comes to be arranged on the cell within the zone of the preceding item; finally the belt is activated again at the second destination, in order to sort the second item. With reference to FIG. 11, the items arriving from an upstream separating system, are analyzed by the bi- and three-dimensional scanning barriers (18) already described above, and subsequently identified when passing through the tunnel (12), which comprises reading systems of the bar code applied on the items, so that within the working zone which can be reached by the manipulator (19), the items sorting destinations are already known. All the conveyor belts located in the working zone comprised between the scanning barriers and the operational zone reachable by the manipulator, are provided with encoders, so that the tracking function for individual parcels with related information previously described can be ensured. Within the working zone of the manipulator (19), there are available destinations of all parcels therein located, thus the items suitable for robotised picking may be identified, wherein the necessary information may be read in the data structure of the items selves, as described in the description of the tracking via the virtual belt. Based on the above information, on the conveyor belt (41), also performing a gathering function, there are disposed ordered pairs of loadable and sortable items, which are so arranged as to be sorted at respective destinations through subsequent activations of the sorting unit (9). FIG. 11 shows picking of a flat in the sequence (a) which flat is then placed onto the conveyor belt (41) according to the suitable position and with correct orientation, as shown in the sequence (b). The sequences in FIG. 11 show the items (43) and (44) having been identified by the control, which items are suitable to form a sortable pair. In other words, after having picked up the item (43) and placed it onto the conveyor belt (41), the manipulator picks up the item (44), which in the example is a parcel being parallel to a large size parcel due to a separating error by the system, and place it onto the belt (41) in an oriented manner as shown in FIG. 12. The same applies to the items (45) and (46) as shown in FIG. 12 (c). At this stage, the pairs of items are transferred onboard the cells (9) of the sorting machine, exactly as would be the case with a single large size parcel. Arrangement of the pairs of items which can be loaded and sorted on the belt (41), may of course occur also during activation of the conveyor belt (41) for the transfer and loading of already accumulated pairs; the conveyor belt (41) is provided with encoder for tracking the parcels and related information according to the method already described, furthermore the manipulator (19) is able to synchronize with the movement of the belt (41) via encoder signals.

The invention therefore allows to increase productivity of the sorting machine and loading line owing to the formation of pairs of parcels and flats which can be loaded onto a cell and sorted thereon. The invention further allows to overcome the drawbacks of double items due to separating errors, wherein sorting errors are reduced. The loading line still ensures loading of large size and irregularly-shaped parcels.

When the products handled are all flats or small regular-shaped parcels, such as in sorting plants destined to clothing distribution, the solution and methods for the integration of the vision and robotics functions allow to overcome the need of automatic loading lines, as shown in FIG. 13 and in FIG. 14. The parcels on the conveyor belt are analyzed by optical three-dimensional barriers (18), and then the manipulator (19) can pick up said items from the conveyor belt, as shown in the sequence (a) of FIG. 13, and further provide for loading thereof onto the cells (9) of the sorting machine, by synchronizing with the movement of the latter, as shown in the sequence (b) of the same figure.

In application cases similar to clothing distribution, wherein items can be envelopes of various sizes and boxes of regular size, a further innovative application of the vision and robotics methods and solutions described, is the direct loading on the sorting machine, which sorting machine is capable of processing two parcels on the same cell, according to the patents EP 0927689 and EP 0963928 already mentioned. The application is shown in the sequences of FIG. 14, i.e., based on the reading of the data contained within the structures of the virtual belt, as previously already described, the control system is able to know positions, size, orientation, and sorting destination of all parcels and flats on the belt. Hence said control system may choose the pair of items which can be loaded and separated from the same cell of the sorting machine. In the example of FIG. 14 illustrating the invention, the pair of correctly oriented items (51) and (52), are arranged exactly on the cells of the sorting machine by a pick and place manipulator provided with independent arms (36), being able to synchronize with the sorting machine and to be coordinated when loading of a large size parcel (54) onto a cell through a picking in opposition is requested. Some robotised lines, such as that shown in FIG. 14, may provide for full loading of the sorting machine, thereby allowing to double its productivity if compared to a common sorting machine, wherein the ability is maintained to identify and overcome drawbacks of double items and partially overlapping flats.

FIG. 15 shows a further possible configuration particularly suitable for direct loading onto the cells of the sorting machine (1) performed by manipulators which operate in parallel, wherein parcels and flats are picked up from a conveyor belt being part of a belt circuit (55), and which runs parallel to the machine. The circuit is provided with a system for the bi- and three-dimensional analysis (18) of the parcel in motion previously already described, and is further supplied with an identification tunnel (12) which is formed by laser scanner or chambers for recognizing the code applied on the parcel. The belt circuit (55) enables an accumulation function in order to compensate for variations within the flow of parcels coming from the feeding line; in other terms, where the incoming flow exceeds the picking and loading capacity of the manipulators in parallel, the circuit allows movement of parcels for picking of the next cycle.

The invention claimed is:

1. A process for feeding items to a sorting machine, comprising the following steps:
    detecting coordinates of points on three-dimensional surfaces of the items with an optical detection device, while the items are in motion on a first conveyor belt or a circuit conveyor device;
    processing the coordinates of points into coordinate vectors to obtain for each item a three-dimensional representation based on which a control system handles a manipulator for picking and placing of the item;
    picking the item from the first conveyor belt or the circuit conveyor device with the manipulator;
    placing the item which was picked by the manipulator onto a second conveyor belt, located upstream of a feeding device, wherein small size items are arranged into pairs of items on the second conveyor belt;
    loading each pair of items simultaneously onto a single sorting cell of the sorting machine using the feeding device;
    sorting, at its respective destination, each item of the pair of items on the sorting cell; and
    loading, via the feeding device, large size items or the items which were not picked up by the manipulator and which are transferred to a third conveyor belt of the feeding device by an orienter conveyor belt.

2. The process of claim 1, comprising a step of verifying effectiveness by the manipulator in picking up the items through vertical movements at high acceleration, by using a detection device in order to make sure that the item does not move away from the manipulator.

3. The process of claim 1, comprising a step of reading a location code on each item, through a support and conveyor belt, where the manipulator temporarily places the item.

4. The process of claim 1, wherein the step of processing the coordinates of points comprises a step of defining an outline in plan of each item and a step of defining a vertical outline of each item, in order to identify items arranged side by side or partially overlapped on one another.

5. The process of claim 4, wherein the items arranged side by side or partially overlapped on one another are removed by the manipulator and placed onto conveyor belts of the feeding device, or onto conveyor belts for temporary placement, or directly onto the sorting cells of the sorting machine in motion.

6. A method of feeding items to a sorting machine, comprising:

acquiring three-dimensional coordinates of items that are advancing on a first conveyor belt;

acquiring a three-dimensional representation of each item based on the three-dimensional coordinates for the item;

moving items from the first conveyor belt to a second conveyor belt, wherein items are arranged into pairs of items on the second conveyor belt;

moving each pair of items from the second conveyor belt onto a respective sorting cell of the sorting machine; and sorting, at its respective destination, each item of the pair of items on the respective sorting cell.

7. The method of claim 6, wherein each item in the pair of items is moved simultaneously from the second conveyor belt onto the respective sorting cell of the sorting machine.

8. The method of claim 6, wherein each item is arranged onto the respective sorting cell such that a longer side of each item is parallel to a motion direction of the respective sorting cell.

* * * * *